United States Patent
Kochar et al.

(10) Patent No.: US 9,652,252 B1
(45) Date of Patent: May 16, 2017

(54) SYSTEM AND METHOD FOR POWER BASED SELECTION OF BOOT IMAGES

(71) Applicant: Xilinx, Inc., San Jose, CA (US)

(72) Inventors: Yatharth K. Kochar, Hyderabad (IN); Ramakrishna G. Poolla, Hyderabad (IN); Krishna C. Patakamuri, Hyderabad (ID); Madhubala Sharma, Hyderabad (ID)

(73) Assignee: XILINX, INC., San Jose, CA (US)

( * ) Notice: Subject to any disclaimer, the term of this patent is extended or adjusted under 35 U.S.C. 154(b) by 269 days.

(21) Appl. No.: 14/527,709

(22) Filed: Oct. 29, 2014

(51) Int. Cl.
*G06F 12/02* (2006.01)
*G06F 9/44* (2006.01)
*G06F 1/32* (2006.01)

(52) U.S. Cl.
CPC .......... *G06F 9/4408* (2013.01); *G06F 1/3212* (2013.01); *G06F 9/441* (2013.01); *G06F 12/0238* (2013.01)

(58) Field of Classification Search
CPC ..... G06F 9/4408; G06F 1/3212; G06F 12/038
See application file for complete search history.

(56) References Cited

U.S. PATENT DOCUMENTS

| | | |
|---|---|---|
| 2005/0125396 A1 | 6/2005 | Liu |
| 2007/0038685 A1 | 2/2007 | Chan et al. |
| 2008/0256366 A1 | 10/2008 | Dale et al. |
| 2009/0089570 A1 | 4/2009 | Andrianov |
| 2010/0070749 A1 | 3/2010 | Tsai |
| 2011/0154007 A1* | 6/2011 | Juvonen ................. G06F 1/3212 713/2 |
| 2014/0281466 A1* | 9/2014 | Samuel ................. G06F 9/4408 713/2 |
| 2016/0041606 A1* | 2/2016 | Andrews ............... G06F 1/3296 713/320 |

OTHER PUBLICATIONS elinux.org, "RPi U-Boot," *Embedded Linux Wiki*, Dec. 2, 2012, web Feb. 18, 2014, <http://elinux.org/index.php?title=RPi_U-boot&oldid=197048&print>.

(Continued)

*Primary Examiner* — Reginald Bragdon
*Assistant Examiner* — Edward Wang
(74) *Attorney, Agent, or Firm* — LeRoy D. Maunu

(57) ABSTRACT

Circuits and methods for power dependent selection of boot images are disclosed. In an example implementation, an apparatus includes a memory circuit and a processor disposed on an integrated circuit die. The processor is configured to retrieve and execute instructions from the memory circuit. The apparatus also includes a power management circuit configured to determine a value indicative of an amount of power available to power the IC die. A boot loader circuit is coupled to the power management circuit and is configured to select one of a plurality of boot images based on the determined value indicative of the amount of power available. The boot loader circuit loads a set of instructions included in the selected one of the boot images into the memory circuit and enables the processor to execute the set of instructions.

17 Claims, 7 Drawing Sheets

(56) References Cited

OTHER PUBLICATIONS

Huang, Andrew, "Keeping Secrets in Hardware: the Microsoft Xbox Case Study," AI Memo 2002-008, May 26, 2001, pp. 1-15, Massachusetts Institute of Technology, Artificial Intelligence Lab, Cambridge, Massachusetts, USA.
U.S. Appl. No. 13/775,151, filed Feb. 23, 2013, Peterson et al.
U.S. Appl. No. 13/833,177, filed Mar. 15, 2013, Sanders et al.
U.S. Appl. No. 14/019,323, filed Sep. 5, 2013, Sanders et al.
Xilinx, Inc., *Zynq-7000 All Programmable SoC Software Developers Guide,* UG821 (v3.0), Oct. 16, 2012, pp. 1-42, Xilinx, Inc., San Jose, California, USA.
Xilinx, Inc., *Zynq-7000 All Programmable SoC Technical Reference Manual,* UG585 (v1.4), Nov. 16, 2012, Chapters 6, 27, 28, 32 (76 pages), Xilinx, Inc., San Jose, California, USA.

\* cited by examiner

SYSTEM AND METHOD FOR POWER BASED SELECTION OF BOOT IMAGES

FIELD OF THE INVENTION

The disclosure generally relates to initialization of programmable integrated circuits (ICs), and more particularly to the searching of boot devices connected to an IC for boot images.

BACKGROUND

Programmable logic devices (PLDs) are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth. Prior to use within any specific application, a programmable IC must undergo a configuration process, where programmable resources of the programmable IC are configured with a set of configuration data, such as a bitstream, that specifies a configuration of programmable hardware resources, such as programmable logic circuits and programmable interconnects, to implement a particular circuit design.

Some programmable ICs include a processor capable of executing program code and provide a particularly robust platform upon which an embedded system can be bunt. Programmable ICs that include a processor, such as system-on-chip (SOC) devices, must also undergo a boot process to load a set of processor instructions into an integrated memory disposed on the programmable IC. For instance, the boot process may load a set of processor instructions of an operating system into the memory at startup. For ease of reference, configuration and boot processes may be referred to as initialization processes herein. Also, initialization data may be used to generally refer to either processor instructions for initialization of a processor and/or a configuration data stream for initialization of programmable resources of a programmable IC.

During the initialization processes, initialization circuits cause the programmable IC to locate and retrieve a boot image including initialization data from a non-volatile memory included on the IC or from a designated peripheral boot device. The initialization circuits may include, for example, a boot loader circuit and/or configuration control circuit. The initialization circuitry uses the initialization data to configure the programmable IC. For example, the initialization circuits may copy a set of processor instructions in the retrieved boot image to an internal volatile memory (RAM) for execution by the processor.

SUMMARY

Various implementations are directed to circuits, apparatuses, and methods for selecting a boot image for a device based on available power. According to an example implementation, an apparatus includes a memory and a processor disposed on an IC die. The processor is configured to retrieve and execute instructions stored in the memory. A power management circuit is also disposed on the IC die and is configured to determine a value indicative of the amount of power available to power the IC die. The apparatus includes a boot loader circuit coupled to the power on the IC die management circuit. The boot loader circuit is configured to select one of a plurality of boot images based on the determined value indicative of the amount of power available. The boot loader circuit loads a set of instructions included in the selected one of the boot images into the memory, and enables the processor to execute the set of instructions.

According to another example implementation, a method is provided for selecting and loading a boot image base on available power. In response to the IC being powered on, a value indicative of an amount of power available to power the IC is determined. Using a boot loader circuit disposed on the IC, one of a plurality of boot images is selected based on the determined value indicative of the amount of power available. The selected boot image is retrieved from a boot device coupled to the IC and stores a set of instructions included in the boot image in a memory disposed on the IC. The set of instructions stored in the memory is executed by a processor on the IC.

According to another example implementation, a system is provided for configuring selection criteria for selection of boot images. The system includes one or more boot devices and a programmable IC coupled to the boot devices. A computing arrangement is coupled to the boot devices and includes a processor and memory circuit. The memory circuit is coupled to the processor and is configured with instructions that when executed by the processor cause the processor to provide a user interface. Responsive to input commands, the user interface selects a plurality of boot images and generates selection criteria for the boot images. The selection criteria indicates respective power requirements for selection of the boot images. The instructions also cause the processor to store the selected plurality of boor images and the generated selection criteria in the boot devices coupled to a programmable IC. The programmable IC is configured, when powered on, to select and retrieve one of the boot images from the boot devices based on the selection criteria and an indication of power available for powering the programmable IC.

It will be appreciated that variations of the semiconductor devices and method are set forth in the Detailed Description and Claims, which follow.

BRIEF DESCRIPTION OF THE DRAWINGS

Various aspects and features of the circuits and methods will become apparent upon review of the following detailed description and upon reference to the drawings in which.

Figure 1:
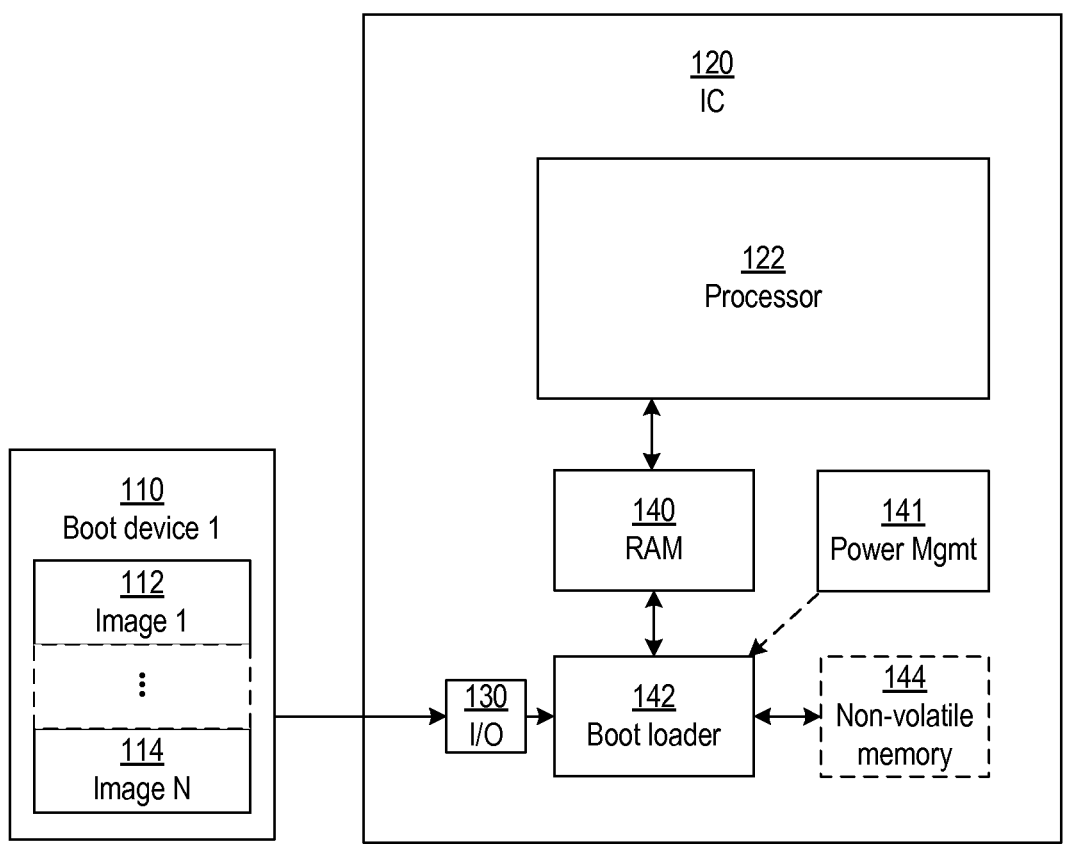
FIG. 1 shows an IC having a boot loader circuit configured to select and load a boot image based on an indication of available power, in accordance with one or implementations.

DETAILED DESCRIPTION OF THE DRAWINGS in the following description, numerous specific details are set forth to describe specific examples presented herein. It should be apparent, however, to one skilled in the art, that one or more other examples and/or variations of these examples may be practiced without all the specific details given below. In other instances; well known features have not been described in detail so as not to obscure the description of the examples herein.

In systems that include processors, the power consumed by the system may vary depending on the software that is executed by the processors. For example, at boot time, power is consumed in the process of retrieving and loading a boot image into memory. Accordingly, loading of a boot image for a large operating system consumes a greater amount of power than loading of a boot image for a smaller operating system. As another example, the power requirements of an operating system may depend on the functions performed by the operating system. For instance, a first OS may perform a first set of functions which requires a processor to execute some arithmetic operations at a first rate. A second OS may perform a number of functions in addition to the first set and also require a processor to execute arithmetic operations at a greater rate—thereby consuming more power.

In one or more applications, an IC includes a boot loader configured to select boot images for configuration of the IC based on an indication of power available to power the IC. The indication of power may indicate, for example, a current, voltage, wattage, amp-hours, and/or type of a power source used to power the IC. Different implementations may use various types of power sources having various current and/or voltages. Some example power sources include, for example, a battery, AC-DC power adapter, and/or universal serial bus (USB) power connector. The boot images may include instructions for execution by a processor and/or for configuration of programmable logic and/or interconnects, for example, in a programmable IC.

In an example implementation, an IC includes a memory and a processor. The processor is configured to retrieve and execute instructions stored in the memory. The IC includes a circuit configured to determine a value indicative of an amount of power available to power the IC and a boot loader configured to select one of a plurality of boot images based on the determined value amount of power available. The boot loader circuit loads a set of instructions in the selected boot image into the memory, and enables the processor to execute the set of instructions.

In some implementations, the boot loader in the IC is configured to select a boot image according to the determined indication of power available and a set of selection criteria, which can be used to determine which boot image should be selected for a determined amount of available power. In different implementations, the selection criteria may be provided to the boot loader via various circuits. For instance, the selection criteria may be stored in a non-volatile memory included in the IC, may be stored in an external memory, or may be provided in a metadata descriptive portion of the boot images.

The plurality of boot images may be stored in non-volatile memory of one or more external boot devices coupled to the IC. The boot loader may select and retrieve boot images from the boot device(s) using various processes. In one implementation, the boot loader may select one of the boot devices, based on available power and the selection criteria and search the selected boot device for a boot image.

In another implementation, the boot loader may search the boot device(s) for boot images. In response to locating a boot image, the boot loader checks to see if selection criteria for the boot image are satisfied by the available power of the IC. If the criteria are satisfied, the boot loader retrieves the boot image and uses the boot image to configure the IC. If the criteria are not satisfied, the boot loader continues to search the boot devices for another boot image.

In different implementations, the selection criteria may specify various functions for selection of the boot images based on an indication of available power. In some implementations, the selection criteria may specify a respective range of a power-related parameter for each boot image including for example, voltage, current, and/or amperage-hours. When powered on, the boot loader may determine a value of a power related parameter exhibited by a power supply and select the boot image having a range that includes the determined value.

The disclosed examples are applicable to initialization of a variety of systems and applications which include programmable circuits. Some implementations may be particularly applicable for use configuring programmable ICs which include a processor and a set of programmable hardware resources. While the implementations are not so limited, for ease of explanation, the examples may be primarily described in this context. In various implementations, the boot images selected based on the indication of available power may be used to program either a processor or programmable hardware resources in a programmable IC. For example, in some implementations, a boot image selected by a boot loader circuit includes processor instructions, such as an operating system, for execution by a processor on a programmable IC. Alternatively or additionally, a boot image selected by a boot loader circuit may include configuration data for initialization of programmable hardware resources of the programmable IC. Furthermore, configuration data provided in a boot image may be used for configuration of programmable ICs with processors or without a processor.

For ease of explanation, some examples may be primarily described with reference to initialization of an IC including a processor. It is understood that such examples may alternatively/additionally be adapted for initializing programmable circuits and or resources in various applications.

Turning now to the figures, FIG. 1 shows an example IC having a boot loader circuit configured to select and load a boot image based on an amount of available power, in accordance with one or more implementations. The IC 120 includes a processor 122 configured to retrieve and execute processor instructions from a random access memory RAM 140 on the IC 120. The IC 120 includes a power management circuit 141 configured to determine one or more power related parameters exhibited by a power source (not shown) used to power the IC. For instance, the power management circuit 141 may determine a value indicative of an amount of power available to power the IC 120.

The IC 120 includes a boot loader circuit 142 configured to select one of a plurality of boot images 112 through 114 based on the determined value indicative of the amount of available power. The boot loader circuit 142 loads a set of instructions included in the selected boot image into the RAM 140. In this example, the boot images 112 and 114 are stored in boot device 110, which is coupled to the IC. The boot device may include, for example, a non-volatile memory or a computing device coupled to the IC. In this example, the boot images 112 through 114 are stored in a single boot device 110. However, boot images may be stored in multiple boot devices connected to the IC 120. The boot loader circuit 142 is configured to retrieve a selected boot image from the boot device 110 via an input/output (I/O) circuit 130 and load instructions included in the retrieved boot image into the RAM 140. The I/O circuit 130 may communicate data between a boot device 110 and the IC 120 using various communication protocols and interfaces including, for example, PCIe, ISA, Serial ATA, JTAG, Ethernet, 802.11, and Bluetooth. After loading the instructions into the RAM 140, the boot loader circuit 142 enables execution of the instructions by the processor 122. For example, after loading the instructions into the RAM, the boot loader circuit 142 may generate a control signal that prompts the processor to begin execution of the instructions in the RAM 140.

In some implementations, the boot loader is configured to select a boot image based on the determined value indicative of available power and a set of selection criteria. For example, as previously described, the selection criteria may specify a function to be used for selection of boot images or may define parameter ranges in which a boot image may be selected. The selection criteria may be stored in a non-volatile memory 144, included on the IC 120, or may be stored in an external memory such as the boot device 110. The selection criteria stored on the boot device 110 may be consolidated in an individual file on the boot device. Alternatively, selection criteria for each boot image may be stored as metadata included in a portion of the boot image.

In some implementations, the selection criteria may select boot images based on various criteria in addition to power related parameters of a power source. For instance, the selection criteria may select boot images based on transfer speeds, error-rates, and/or respective statuses of boot devices coupled to the IC.

Figure 2:
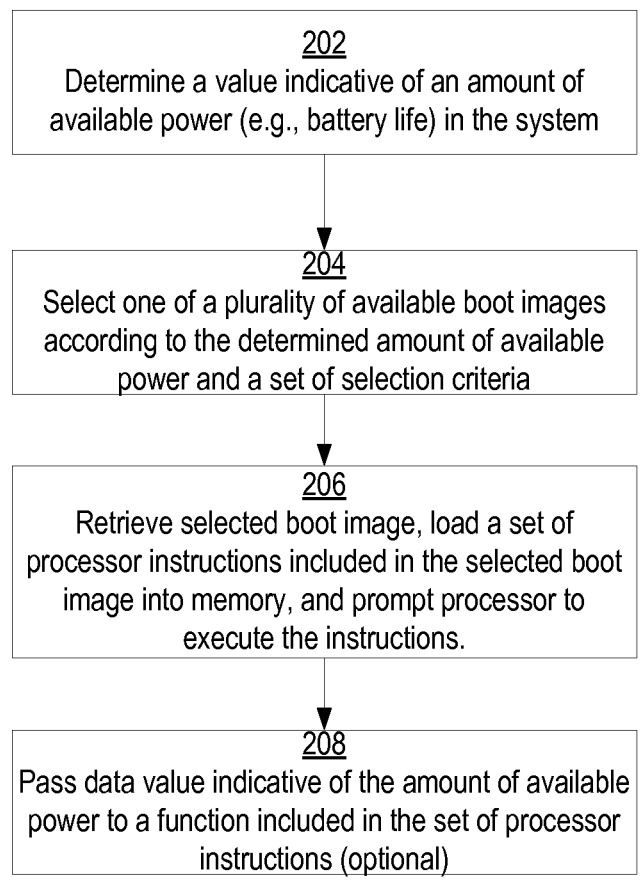
FIG. 2 shows a process for loading a boot image at startup, in accordance with one or more implementations.

FIG. 2 shows a process for loading a boot image at startup, in accordance with one or more implementations. At block 202, a value indicative of available power in the system is determined. At block 204, one of a plurality of boot images is selected according to the determined value indicative of available power and a set of selection criteria. At block 206, the selected boot image is retrieved and a set of processor instructions included in the selected boot image is loaded into a memory. Also at block 206, a processor is prompted to begin execution of the set of instructions in the memory.

Optionally, the value indicative of the amount of available power may be provided as an argument to a function included in the set of instructions at block 208. For instance, an operating system defined by the set of instructions may execute a first function to begin operating in a high-power mode if the value indicative of available power exceeds a threshold value. In the high power mode, the operating system may provide a full set of features. If the value indicative of available power is less than or equal to the threshold value, the operating system may execute a second function to begin operating in a low-power mode. In the low-power mode, the operating system may disable one or more non-essential or power expensive features, such as wireless connectivity.

Figure 3:
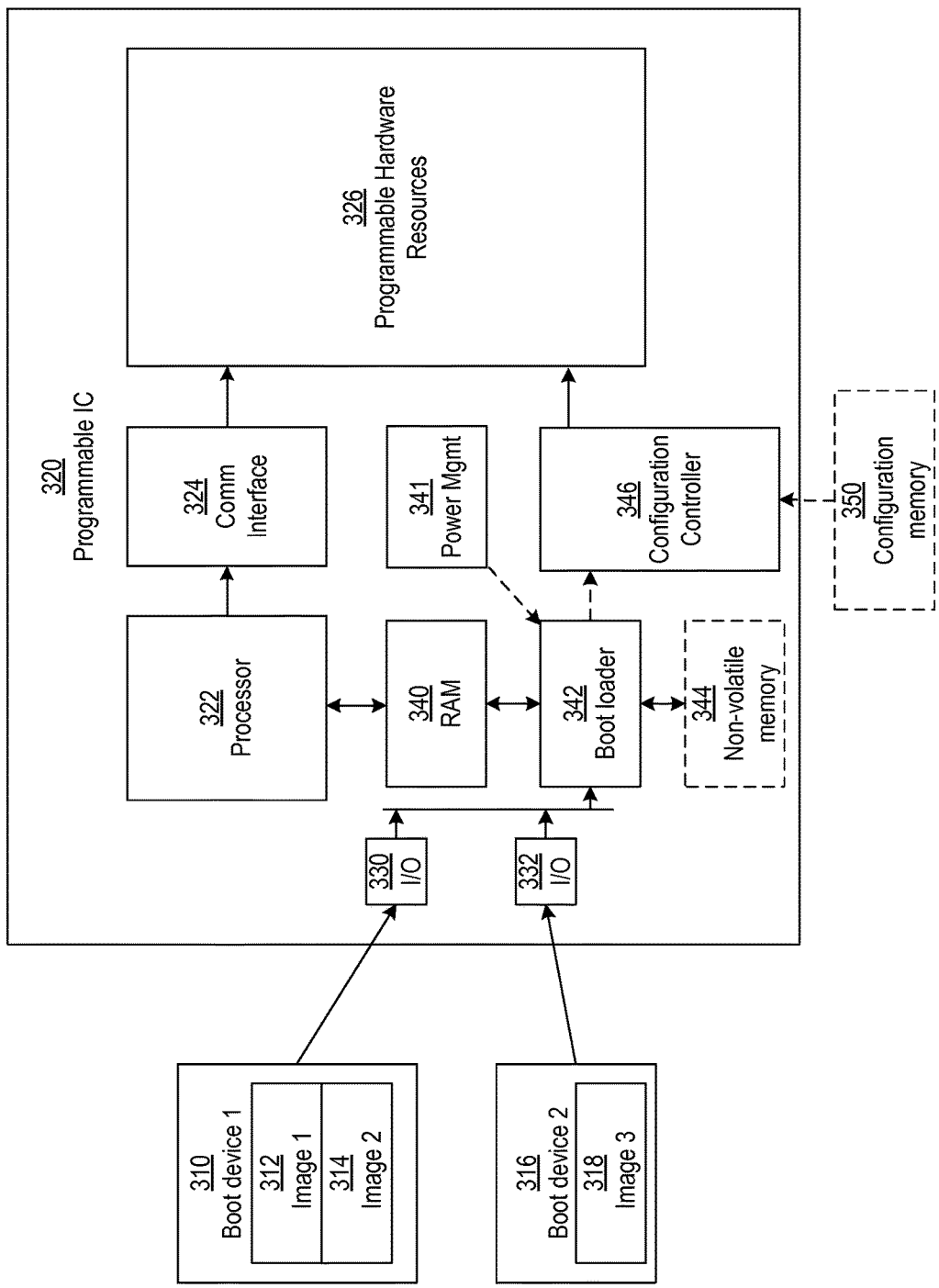
FIG. 3 shows a programmable IC having a boot loader circuit configured to select and load a boot image based on an indication of available power, in accordance with one or implementations.

As previously indicated, a boot loader circuit may be adapted for initializing programmable circuits and or resources in various systems and devices. FIG. 3 shows a programmable IC having a boot loader circuit configured to select and load a boot image based on an indication of available power. The programmable IC 320 includes a set of programmable hardware resources 326 and a processor 322. The processor is configured to retrieve and execute processor instructions from a memory 340 included on the programmable IC 320. A configuration controller 346 is configured to program the programmable hardware resources to implement a circuit specified by a set of configuration data. The processor may be configured to communicate data with circuits implemented by the programmable hardware resources via a communication interface 324.

The programmable IC 320 includes a power management circuit 341 configured to determine a value indicative of an amount of power available to power the IC 320. The programmable IC 320 also includes a boot loader circuit 342 configured to select one of a plurality of boot images 312, 314, and 318 based on the determined value indicative of the amount of available power.

In this example, the boot images 312, 314, and 318 are stored in two boot devices 310 and 316 that are coupled to the programmable IC 320. However, the circuits may be adapted to connect a larger number of boot devices. As shown in boot device 310, the boot devices may store multiple boot images. In some implementations, the boot loader is configured to select a boot image based on the determined value indicative of available power and a set of selection criteria. As explained with reference to FIG. 1, the selection criteria may specify a function to be used for selection of boot images or may define parameter ranges in which a boot image may be selected. In various implementations, the selection criteria may be stored in a non-volatile memory 344 included on the IC 320 or may be stored in an external memory, such as one or more of the boot devices 310 or 316.

After selecting a boot image, the boot loader circuit 342 is configured to retrieve the selected boot image from the boot device 310 or 316 via an I/O circuit 330 or 332. The I/O circuits 330 or 332 may communicate data using various respective communication protocols and or interfaces including, for example, PCIe, ISA, Serial ATA, JTAG Ethernet, 802.11, and Bluetooth.

The boot loader circuit 342 loads a set of instructions included in the retrieved boot image into the RAM 340. In some implementations, the configuration controller 346 may configure the programmable hardware resources 326 using a set of configuration data included in the selected boot image. The configuration data in the selected boot image may be provided to configuration controller 346, for example, by the boot loader circuit 342. The configuration controller may retrieve configuration data used to program the programmable hardware resources 326 from a separate configuration memory 350.

As previously described, the boot loader circuit 342 may select and retrieve boot images from the boot device(s) using various processes using the selection criteria. For example, the boot loader circuit 342 may select one of the boot images 312, 314, and 318 and retrieve the selected boot image from the boot device or address associated with the boot image in a boot list. Such a boot list may be stored, for example, in non-volatile memory 344. In another implementation, the boot loader circuit 342 may select one of the boot devices 310 and 316, based on available power and the selection criteria and search the selected boot device for a boot image.

In some other implementations, the boot loader circuit 342 may search the boot devices 310 and 316 for boot images 312, 314, and 318 and determine whether or not criteria is satisfied for boot images as they are located in the search.

Figure 4:
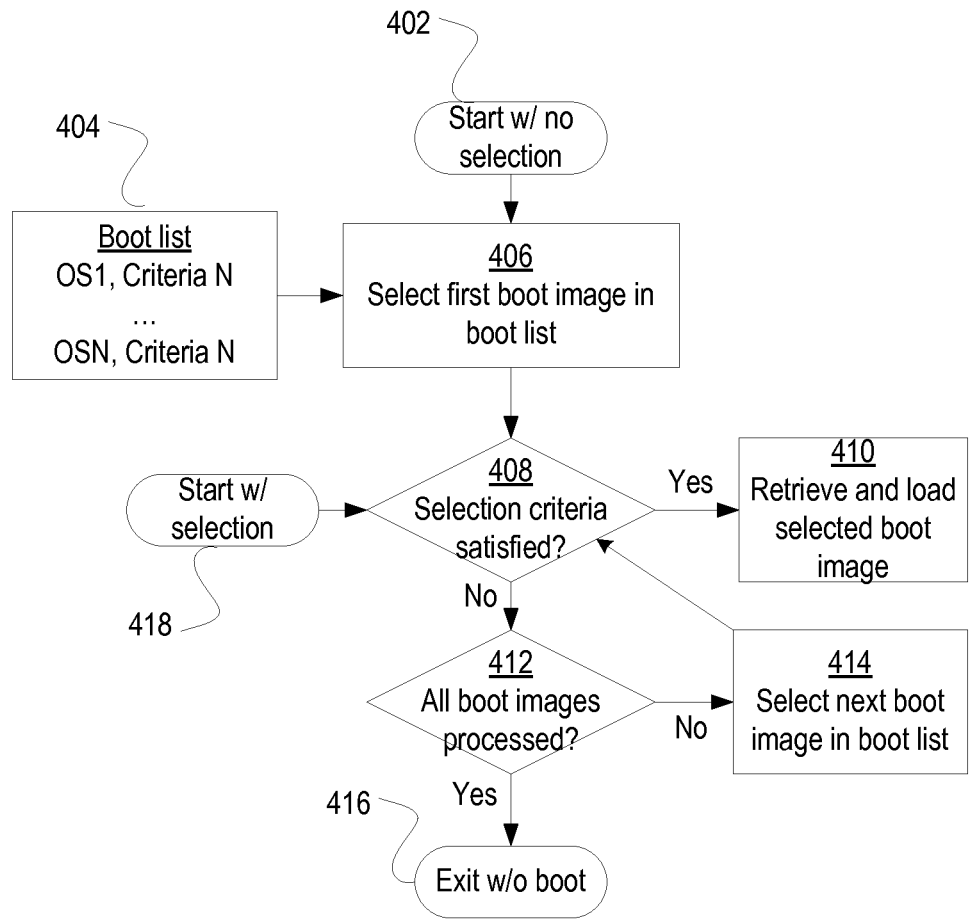
FIG. 4 shows a process for selecting a boot image at startup, in accordance with one or more implementations.

FIG. 4 shows an example process of selecting a boot image at startup. The process may be performed, for example, by the boot loader circuits 142 and 342 in FIGS. 1 and 3. At block 402, the process starts with no boot image having been selected by a user. At block 406, the process selects a first boot image in a boot list 404. The boot list 404 specifies respective selection criteria for each boot image identified in the boot list 404. If the selection criteria for the selected boot image is satisfied at decision block 408, the process retrieves and loads the selected boot image into a memory of the device at block 410. Otherwise, if the selection criteria for the selected boot image is not satisfied at decision block 408, the process proceeds to decision block 412. If all images have not been processed, decision block 412 directs the process to select the next boot image identified in the boot list 404 at block 414 and continue to decision block 408. The process repeats until the selection criteria are satisfied at decision block 408 or until all boot images have been processed when the process reaches decision block 412. If all boot images have been processed at decision block 412, the process exits at block 416 and no boot image is loaded.

In some implementations, a user may be able to initiate the process with a user selection of a boot image at block 418. If the criteria for the user selected boot image are satisfied at decision block 408, the boot image is retrieved and loaded at block 410. Otherwise, the process selects a boot image from the boot list 404 as previously described.

Figure 5:
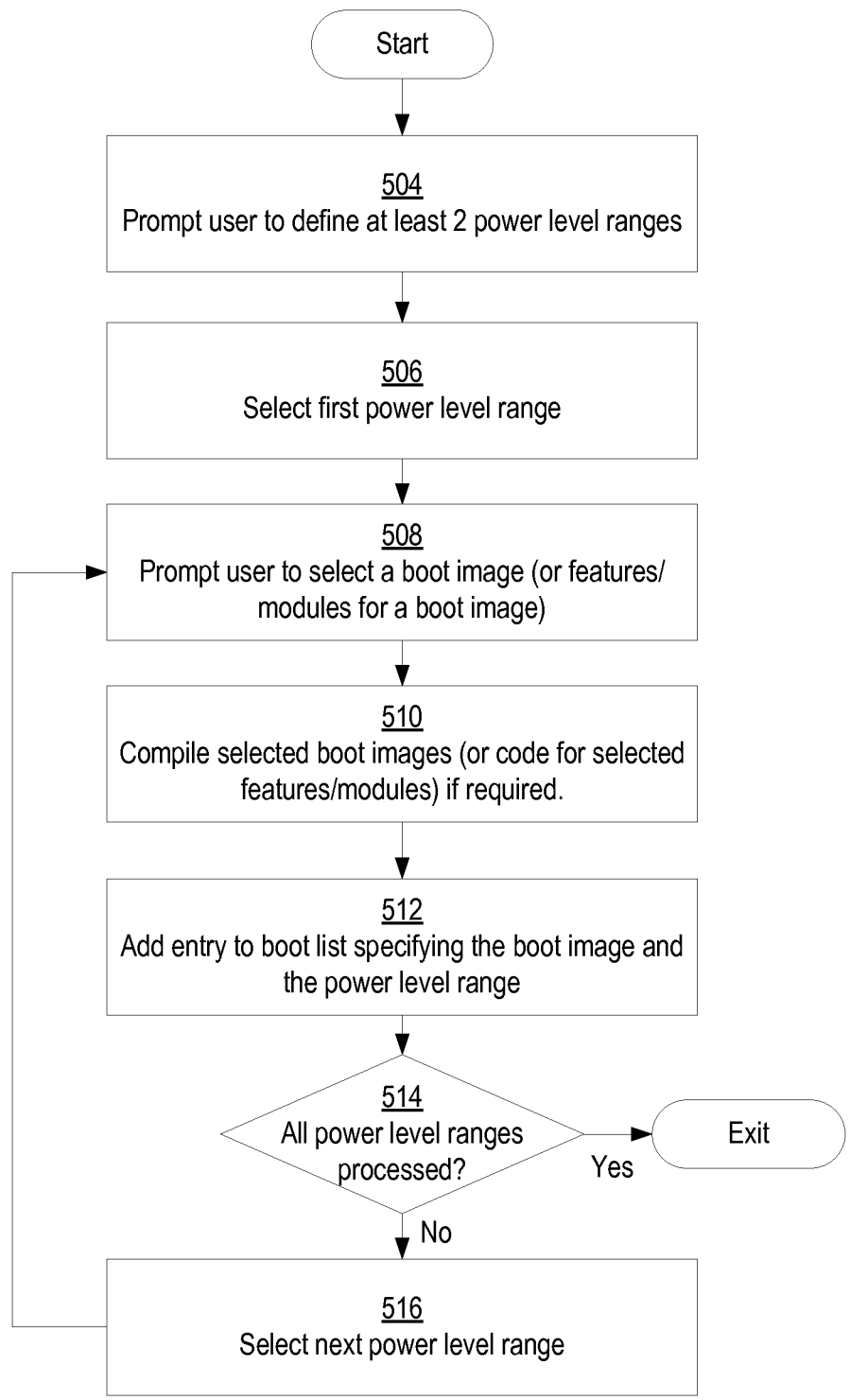
FIG. 5 shows a process for configuring a boot list to specify selection criteria for a plurality of boot images, in accordance with one or more implementations.

In some implementations, a software-based design tool may be configured to allow a user to select a plurality of boot images to be used and allow the user to configure selection criteria to be used for selection of one of the boot images. FIG. 5 shows an example process for configuring a boot list to specify selection criteria for a plurality of boot images. At block 504, a user is prompted, to define at least two power level ranges that can be selected as a function of a power related parameter. The user may be prompted, for example, via a graphical user interface (GUI) provided by a software-based design tool. At block 506, a first one of the power level ranges is selected. At block 508, the user is prompted to select a boot image to be selected when an IC is operated in the selected power level range. Alternatively, in some implementations, a user may be able to select specific features or modules to be included in the boot image for the selected power level range at block 508. At block 510, the selected boot image (or code for selected features or modules) is compiled, if the selected boot image has not yet been compiled. At block 512, an entry is added to a boot list that specifies the selected boot image and power level range. At decision block 514, if all power level ranges have not been processed, the process selects the next power level range at block 516 and returns to block 508. The process is repeated at blocks 508, 510, and 512 until all of the power level ranges have been processed when the process reaches decision block 514.

As an alternative to the process shown in FIG. 5, in some implementations the GUI may prompt a user to select a plurality of boot images and automatically determine power level ranges for the selected boot images. As previously described, power ranges may be determined based on size and/or functions performed by the selected boot images.

For ease of explanation, the above examples are primarily described with reference to a single stage initialization process. However, various aspects are also applicable to multi-stage initialization processes, where different boot images are used in different stages. For instance, a first boot image may be used in a first stage to configure a first set of programmable resources to implement a first set of circuits. After completing the first boot stage, a second boot image may be selected based on indicated power available and be used in a second boot stage to configure a second set of programmable resources to implement a second set of circuits. In some scenarios, one or more of the first set of programmable resources may be reconfigured in the second boot stage to implement one or more of the second set of circuits. In each stage of a multi-stage initialization process, a boot loader circuit may be adapted to select a boot image based on an indication of available power, as described above.

Figure 6:
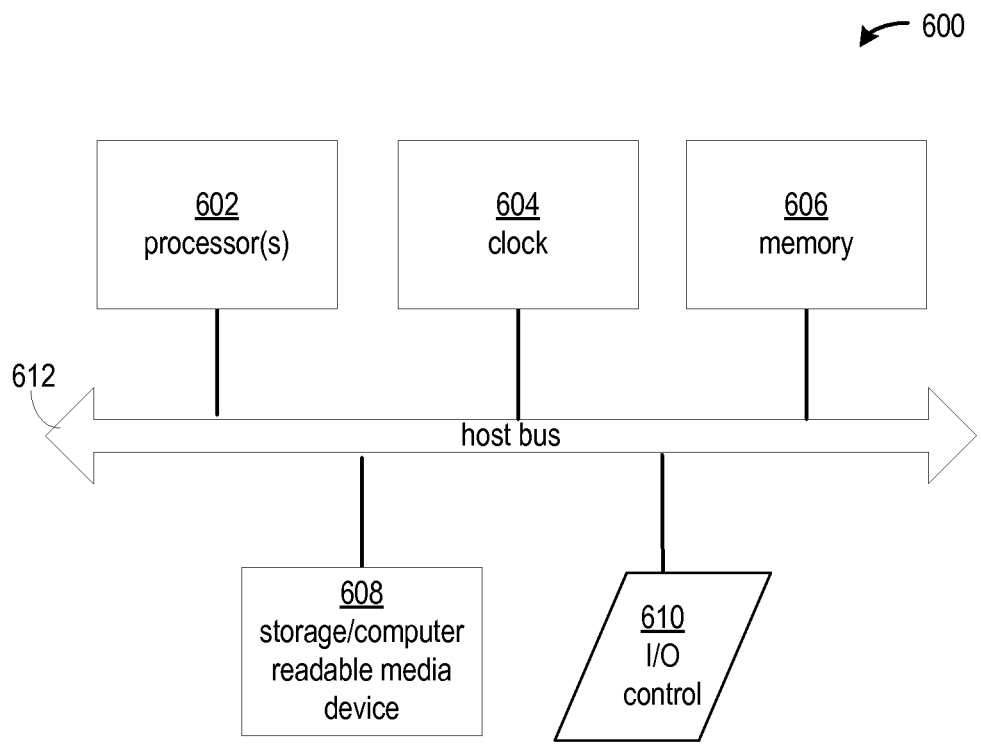
FIG. 6 shows a block diagram of a computing system that may be configured to perform various processes disclosed herein.

FIG. 6 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 600 includes one or more processors 602, a clock signal generator 604, a memory arrangement 606, a storage arrangement 608, and an input/output control unit 610, all coupled to a host bus 612. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 602 may be one or more general purpose processors, or a combination of one or more general purpose processors and suitable co-processors, or one or more specialized processors (e.g., RISC, CISC, pipelined, etc.).

The memory arrangement 606 typically includes multiple levels of cache memory, and a main memory. The storage arrangement 608 may include local and/or remote persistent storage, such as provided by magnetic disks (not shown), flash, EPROM, or other non-volatile data storage. The storage unit may be read or read/write capable. Further, the memory arrangement 606 and storage arrangement 608 may be combined in a single arrangement.

The processor(s) 602 executes the software in storage arrangement 608 and/or memory arrangement 606, reads data from and stores data to the storage arrangement 608 and/or memory arrangement 606, and communicates with external devices through the input/output control arrangement 610. These functions are synchronized by the clock signal generator 604. The resource of the computing arrangement may be managed by either an operating system (not shown), or a hardware control unit (not shown).

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Figure 7:
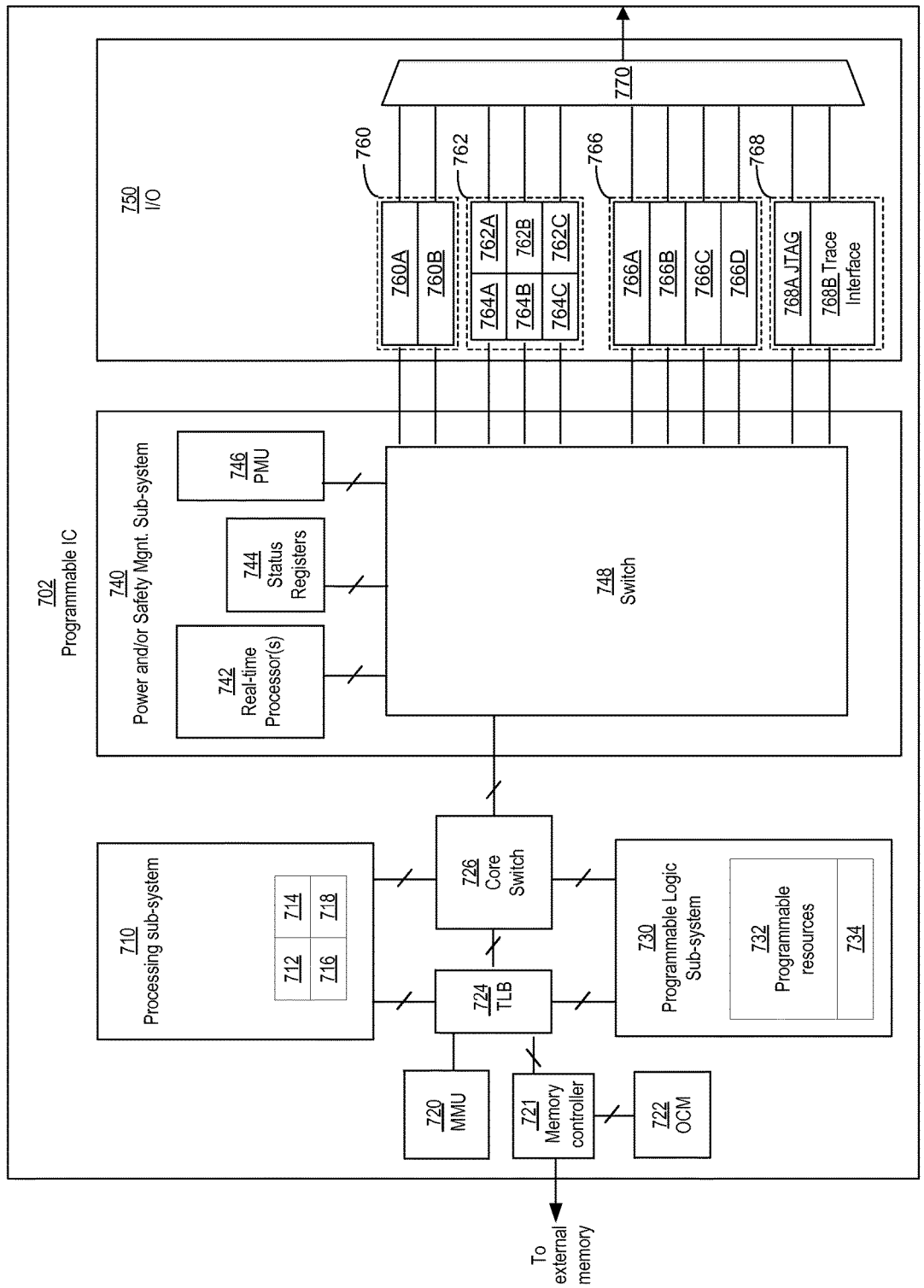
FIG. 7 shows a block diagram of an example programmable IC that may be initialized by searching a plurality of boot devices for an uncorrupt boot image.

As indicated above, the disclosed examples may be applied to a variety of programmable ICs. Although the above examples are primarily described with reference to a programmable IC having an embedded processor, the examples may be adapted for initialization of other types of programmable ICs including, e.g., programmable ICs without a processor or with a processor implemented using programmable hardware resources. FIG. 7 shows a more detailed block diagram of an example programmable IC that may be configured to select a boot image, for configuring a processor or programmable hardware resources, based on an indication of available power.

FIG. 7 shows a programmable IC 702 that may be configured in accordance with one or more implementations. The programmable IC may also be referred to as a System On Chip (SOC), which includes a processing sub-system 710 and a programmable logic sub-system 730. The processing sub-system 710 may be programmed to implement a software portion of the user design, via execution of a user program. The program may be specified as part of a configuration data stream or may be retrieved from an on-chip or off-chip data storage device. The processing sub-system 710 may include various circuits 712, 714, 716, and 718 for executing one or more software programs. The circuits 712, 714, 716, and 718 may include, for example, one or more processor cores, floating point units (FPUs), an interrupt processing unit, on chip-memory, memory caches, and/or cache coherent interconnect.

The programmable logic sub-system 730 of the programmable IC 702 may be programmed to implement a hardware portion of a user design. For instance, the programmable logic sub-system may include a number of programmable resources 732, which may be programmed to implement a set of circuits specified in a configuration data stream. The programmable resources 732 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 732 may be programmed by loading a configuration data stream into the configuration memory cells, which define how the programmable interconnect circuits and programmable logic circuits are configured. The collective states of the individual memory cells then determine the function of the programmable resources 732. The configuration data can be read from memory (e.g., from an external PROM) or written into the programmable IC 702 by an external device. In some implementations, configuration data may be loaded into configuration memory cells by a configuration controller 734 included in the programmable logic sub-system 730. In some other implementations, the configuration data may be loaded into the configuration memory cells by a start-up process executed by the processor sub-system 710.

The programmable IC 702 may include various circuits to interconnect the processing sub-system 710 with circuitry implemented within the programmable logic sub-system 730. In this example, the programmable IC 702 includes a core switch 726 that can route data signals between various data ports of the processing sub-system 710 and the programmable logic sub-system 730. The core switch 726 may also route data signals between either of the programmable logic or processing sub-systems 710 and 730 and various other circuits of the programmable IC, such as an internal data bus. Alternatively or additionally, the processing sub-system 710 may include an interface to directly connect with the programmable logic sub-system—bypassing the core switch 726. Such an interface may be implemented, for example, using the AMBA AXI Protocol Specification (AXI) as published by ARM.

In some implementations, the processing sub-system 710 and the programmable logic sub-system 730 may also read or write to memory locations of an on-chip memory 722 or off-chip memory (not shown) via memory controller 721. The memory controller 721 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 721 is able to communicate is provided for purposes of illustration only and is not intended as a limitation or to be exhaustive. As shown in FIG. 7, the programmable IC 702 may include a memory management unit 720 and translation look-aside buffer 724 to translate virtual memory addresses used by the sub-systems 710 and 730 to physical memory addresses used by the memory controller 721 to access specific memory locations.

The programmable IC may include an input/output (I/O) sub-system 750 for communication of data with external circuits. The I/O sub-system 750 may include various types of I/O devices or interfaces including for example, flash memory type I/O devices, higher performance I/O devices, lower performance interfaces, debugging I/O devices, and/or RAM I/O devices.

The I/O sub-system 750 may include one or more flash memory interfaces 760 illustrated as 760A and 760B. For example, one or more of flash memory interfaces 760 can be implemented as a Quad-Serial Peripheral Interface (QSPI) configured for 4-bit communication. One or more of flash memory interfaces 760 can be implemented as a parallel 8-bit NOR/SRAM type of interface. One or more of flash memory interfaces 760 can be implemented as a NAND interface configured for 8-bit and/or 16-bit communication. It should be appreciated that the particular interfaces described are provided for purposes of illustration and not limitation. Other interfaces having different bit widths can be used.

The I/O sub-system 750 can include one or more interfaces 762 providing a higher level of performance than flash memory interfaces 760. Each of interfaces 762A-762C can be coupled to a DMA controller 764A-764C respectively. For example, one or more of interfaces 762 can be implemented as a Universal Serial Bus (USB) type of interface. One or more of interfaces 762 can be implemented as a gigabit Ethernet type of interface. One or more of interfaces 762 can be implemented as a Secure Digital (SD) type of interface.

The I/O sub-system 750 may also include one or more interfaces 766 such as interfaces 766A-766D that provide a lower level of performance than interfaces 762. For example, one or more of interfaces 766 can be implemented as a General Purpose I/O (GPIO) type of interface. One or more of interfaces 766 can be implemented as a Universal Asynchronous Receiver/Transmitter (UART) type of interface. One or more of interfaces 766 can be implemented in the form of a Serial Peripheral Interface (SPI) bus type of interface. One or more of interfaces 766 can be implemented in the form of a Controller-Area-Network (CAN) type of interface and/or an I²C type of interface. One or more of interfaces 766 also can be implemented in the form of a Triple Timer Counter (TTC) and/or a Watchdog Timer (WDT) type of interface.

The I/O sub-system 750 can include one or more debug interfaces 768 such as processor JTAG (PJTAG) interface 768A and a trace interface 768B. PJTAG interface 768A can provide an external debug interface for the programmable IC 702. Trace interface 768B can provide a port to receive debug, e.g., trace, information from the processing sub-system 710 or the programmable logic sub-system 730.

As shown, each of interfaces 760, 762, 766, and 768 can be coupled to a multiplexer 770. Multiplexer 770 provides a plurality of outputs that can be directly routed or coupled to external pins of the programmable IC 702, e.g., balls of the package within which the programmable IC 702 is disposed. For example, I/O pins of programmable IC 702 can be shared among interfaces 760, 762, 766, and 768. A user can configure multiplexer 770, via a configuration data stream to select which of interfaces 760-768 are to be used and, therefore, coupled to I/O pins of programmable IC 702 via multiplexer 770. The I/O sub-system 750, may also include a fabric multiplexer I/O (FMIO) interface (not shown) to connect interfaces 762-768 to programmable logic circuits of the programmable logic sub-system. Additionally or alternatively, the programmable logic sub-system 730 can be configured to implement one or more I/O circuits within programmable logic. In some implementations, the programmable IC 702 may also include a sub-system 740 having various circuits for power and/or safety management. For example, the sub-system 740 may include a power management unit 746 configured to monitor and maintain one or more voltage domains used to power the various sub-systems of the programmable IC 702. In some implementations, the power management unit 746 may disable power of individual sub-systems, when idle, to reduce power consumption, without disabling power to sub-systems in use.

The sub-system 740 may also include safety circuits to monitor the status of the sub-systems to ensure correct operation. For instance, the sub-system 740 may include one or more real-time processors 742 configured to monitor the status of the various sub-systems (e.g., as indicated in status registers 744). The real-time processors 742 may be configured to perform a number of tasks in response to detecting errors. For example, for some errors, the real-time processors 742 may generate an alert in response to detecting an error. As another example, the real-time processors 742 may reset a sub-system to attempt to restore the sub-system to correct operation. The sub-system 740 includes a switch network 748 that may be used to interconnect various sub-systems. For example, the switch network 748 may be configured to connect the various sub-systems 710, 730, and 740 to various interfaces of the I/O sub-system 750. In some applications, the switch network 748 may also be used to isolate the real-time processors 742 from the sub-systems that are to be monitored. Such isolation may be required by certain application standards (e.g., IEC-61508 SIL3 or ISO-26262 standards) to ensure that the real-time processors 742 are not affected by errors that occur in other sub-systems.

The methods and circuits are thought to be applicable to initialization of a variety of programmable devices, such as programmable ICs. Other aspects and features will be apparent to those skilled in the art from consideration of the specification. For example, although aspects and features may in some cases be described in individual figures, it will be appreciated that features from one figure can be combined with features of another figure even though the combination is not explicitly shown or explicitly described as a combination. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. An apparatus, comprising:
a memory circuit disposed on an integrated circuit (IC) die;
a processor disposed on the IC die, coupled to the memory circuit, and configured and arranged to retrieve and execute instructions from the memory circuit;
a power management circuit disposed on the IC die and configured to determine a value indicative of an amount of power available to power the IC die; and
a boot loader circuit disposed on the IC die, coupled to the power management circuit, and configured to:
select one of a plurality of boot images based on the determined value indicative of the amount of power available and respective power ranges associated with the plurality of boot images, wherein each power range of the respective power ranges is a function of a size of the associated boot image;
load a set of instructions included in the selected one of the boot images into the memory circuit; and
enable the processor to execute the set of instructions.

2. The apparatus of claim 1, wherein:
the plurality of boot images are stored in two or more boot devices coupled to the IC die; and
the selecting of one of the plurality of boot images by the boot loader circuit includes selecting one of the boot devices based on the value indicative of the amount of power available.

3. The apparatus of claim 1, further comprising:
a battery coupled to the power management circuit; and
wherein the value indicative of the amount of power available indicates an amount of power stored in the battery.

4. The apparatus of claim 1, further comprising:
a non-volatile memory; and
wherein the boot loader circuit is configured to select one of the plurality of boot images based on the value indicative of the amount of power available and selection criteria stored in the non-volatile memory.

5. The apparatus of claim 4, wherein the selection criteria specifies, for one or more of the plurality of boot images, the respective power range of the value in which the boot image is to be selected.

6. The apparatus of claim 1, wherein the boot loader circuit is further configured to retrieve the selected one of the boot images from a boot device coupled to the IC die.

7. The apparatus of claim 6, wherein the boot loader circuit is configured to select one of the plurality of boot images based on the determined value indicative of the amount of power available and a set of selection criteria stored on the boot device.

8. The apparatus of claim 1, wherein:
the boot loader circuit is further configured to provide the value indicative of an amount of power available to a function included in the set of instructions.

9. The apparatus of claim 1, further comprising:
programmable hardware resources disposed on the IC die and coupled to the processor; and
a configuration control circuit disposed on the IC die and configured and arranged to program the programmable hardware resources with a set of configuration data, wherein the processor is configured to communicate data with the programmable hardware resources.

10. The apparatus of claim 9, wherein the boot loader circuit is configured to select one of the plurality of boot images based on the determined value indicative of the amount of power available and selection criteria specified in the set of configuration data.

11. The apparatus of claim 9, wherein the boot loader circuit is further configured to:
retrieve the set of configuration data from the selected boot image and provide the set of configuration data to the configuration control circuit.

12. A method of configuring an integrated circuit (IC) having a processor, the method comprising:
in response to the IC being powered on, determining a value indicative of an amount of power available to power the IC; and
using a boot loader circuit disposed on the IC,
selecting one of a plurality of boot images based on the value indicative of the amount of power available and respective power ranges associated with the plurality of boot images, wherein each power range of the respective power ranges is a function of a size of the associated boot image, and
retrieving the selected boot image from a boot device coupled to the IC and storing a set of instructions included in the boot image in a memory disposed on the IC; and
using the processor, executing the set of instructions stored in the memory.

13. The method of claim 12, further comprising:
providing the value indicative of the amount of power available to a function included in the set of instructions;
executing a first function included in the set of instructions in response to the value exceeding a threshold value; and
executing a second function included in the set of instructions in response to the value being less than or equal to the threshold value.

14. The method of claim 12, wherein the selecting of one of the plurality of boot images includes retrieving a selection criteria for one or more of the plurality of boot images from a non-volatile memory.

15. The method of claim 12, wherein:
the IC includes programmable hardware resources coupled to the processor, and
further comprising, using a configuration controller, programming the programmable hardware resources with a set of configuration data included in the selected boot image, wherein the processor is configured to communicate data with the programmable hardware resources.

16. A system, comprising:
one or more boot devices;
a programmable (integrated circuit) IC coupled to the boot devices; and
a computing arrangement coupled to the one or more boot devices and including:
a processor; and
a memory circuit coupled to the processor and configured with instructions that when executed by the processor cause the processor to perform operations including:
providing a user interface that, responsive to input commands, selects a plurality of boot images and selection criteria for the boot images, the selection criteria indicating a respective range of power requirements for operation of each of the plurality of boot images;
determining the respective range of power required for operation of each of the plurality of boot images based on a size of the boot image; and
storing the selected plurality of boot images and the generated selection criteria in boot devices coupled to the programmable IC, wherein the programmable IC is configured to, when powered on, select and retrieve one of the boot images from the boot devices based on the selection criteria and an indication of power available for powering the programmable IC.

17. The system of claim 16, wherein the respective range of available power is specified to the user interface via the input commands.

* * * * *